United States Patent [19]

Kuroiwa et al.

[11] Patent Number: 4,730,963
[45] Date of Patent: Mar. 15, 1988

[54] BROACHING MACHINE FOR EXTERNAL BROACHING OF ROTOR

[75] Inventors: Yosio Kuroiwa, Toyota; Hosao Shirai, Aichi; Takuo Sibata, Okazaki; Sakae Sugishima, Toyota, all of Japan

[73] Assignee: Toyota Jidosha Kabushiki Kaisha, Toyota, Japan

[21] Appl. No.: 893,949

[22] Filed: Aug. 6, 1986

[30] Foreign Application Priority Data

Aug. 8, 1985 [JP] Japan .................. 60-121970[U]

[51] Int. Cl.⁴ ............................................ B23D 41/06
[52] U.S. Cl. ..................................................... 409/278
[58] Field of Search ............... 409/218, 220, 256, 257, 409/269, 271, 277, 276, 278, 279; 269/196, 217, 229

[56] References Cited

U.S. PATENT DOCUMENTS 2,225,731  12/1940  Averill .......................... 409/277 X
3,636,747   1/1972  Esterzon et al. ............. 409/278 X
4,576,367   3/1986  Horn et al. .................... 269/229 X Primary Examiner—Eugene F. Desmond
Attorney, Agent, or Firm—Oblon, Fisher, Spivak, McClelland & Maier

[57] ABSTRACT

A broaching machine for broaching an outer surface of a rotor of a rotor assembly which includes a support shaft projecting from opposite end faces of the rotor for supporting the rotor rotatably about its axis. The machine includes a backing plate for backing the rotor assembly such that one of the end faces of the rotor is held in contact with backing plate. The circumferential position of the rotor assembly is established by a positioning pin which extends from the backing plate, and engages a hole formed in the rotor. The machine includes a first centering device which has a center engageable with one of opposite ends of the support shaft so as to hold and center the support shaft at the one end, and a second centering device having a V-block and a retainer block which are engageable with the other end of the support shaft so as to hold and center the support shaft at the other end. With the first and second centering devices, the rotor assembly is easily and accurately mounted on the machine, with the axis of rotation of the assembly aligned with a line of feed of a broach cutter.

15 Claims, 7 Drawing Figures

BROACHING MACHINE FOR EXTERNAL BROACHING OF ROTOR

BACKGROUND OF THE INVENTION

1. Field of the Invention

The present invention relates to improvements in a broaching machine for broaching an outer surface of a rotor of a rotor assembly which consists of the rotor and a support shaft for supporting the rotor rotatably about its axis.

2. Description of the Art

A fluid machine of a Roots type using a plurality of rotor assemblies is known. Each of the rotor assemblies consists of a rotor, and a support shaft for rotatably supporting the rotor about its axis of rotation. Opposite end portions of the support shaft project from opposite end faces of the rotor in opposite directions parallel to the axis of rotation of the rotor. For finishing the outer surface of the rotor to a desired shape with a comparatively high level of dimensional accuracy, it is known to use a broaching machine wherein a broaching cut is made by a broach which is adapted to be fed in the direction parallel to the axis of rotation of the rotor.

To finish the outer surface of the rotor on such a broaching machine, the rotor assembly must be mounted in place on the machine with a large clamping force sufficient to withstand a cutting force of a broach cutter against the rotor assembly. Further, the rotor assembly must be accurately centered with its axis of rotation aligned with the line of feed of the broach cutter, and also be precisely positioned in its circumferential direction. Consequently, the mounting and removal of the rotor assembly on and from the broaching machine are considerably cumbersome and time-consuming. Thus, the finishing of the rotor surface by the broaching machine requires a relatively long non-productive time period for mounting the workpiece and dismounting the finished workpiece, whereby the broaching machine suffers from relatively low productivity or operating efficiency.

SUMMARY OF THE INVENTION

It is therefore an object of the present invention to provide a broaching machine for broaching an outer surface of a rotor of a rotor assembly, which provides for easy and accurate centering and circumferential positioning of the rotor assembly upon mounting thereof, and easy removal of the broached rotor assembly.

According to the present invention, there is provided a broaching machine for broaching an outer surface of a rotor assembly by feeding a broach in a broaching direction parallel to an axis of rotation of the rotor assembly, the rotor assembly including a rotor having the outer surface, and a support shaft which projects from opposite end faces of the rotor in opposite directions parallel to the axis of rotation of the rotor, the broaching machine comprising a backing plate, a positioning pin, and centering means.

The backing plate backs the rotor assembly such that the backing plate is held in contact with one of the opposite end faces of the rotor at which the broach terminates a broaching cut in the broaching direction. The positioning pin extends from the backing plate toward the above-indicated one end face of the rotor, so that the pin engages a positioning hole formed in the end face of the rotor, thereby positioning the rotor assembly in a circumferential direction thereof. The centering means comprises a first centerng device which includes a center portion that is engageable with one of opposite ends of the support shaft so as to hold and center the support shaft at its one end. The centering means further comprises a second centering device including a V-block and a retainer block which are engageable with the other end of the support shaft so as to hold and center the support shaft at the other end. Thus, the centering means functions to center the rotor assembly, aligning the axis of rotation with a line of feed of the broach in the broaching direction of the machine.

In the broaching machine of the present invention constructed as described above, the rotor assembly is easily positioned in its circumferential direction by simply placing the rotor assembly on the machine such that one of the opposite end faces of the rotor is backed by the backing plate, and such that the positioning pin extending from the backing plate is held in engagement with the corresponding positioning hole formed in the above-indicated one end face of the rotor. Further, the rotor assembly is easily supported and centered by the first and second centering devices such that the center of the first centering device engages one of opposite ends of the support shafts, while the V-block and the retainer block of the second centering device cooperate to hold the other end of the support shaft therebetween. After the rotor is broached by the broach, the rotor assembly is easily dismounted from the machine, by simply moving the center off the above-indicated one end of the support shaft, and moving the V-block and the retainer block off the other end of the support shaft. Therefore, the instant broaching machine is improved in terms of its operating efficiency.

According to one feature of the present invention, the first and second centering devices are positioned relative to the backing plate such that the above-indicated other end of the support shaft of the rotor assembly to be held by the second centering device corresponds to the above-indicated one end face of the rotor, while the above-indicated one end of the support shaft to be held by the first centering device corresponds to the above-indicated other end face of the rotor.

In one form of the above feature of the invention, the broach is fed in the vertical direction. In this case, the center of the first centering device is adapted to be engageable with an upper end of the support shaft which is the above-indicated one end of the support shaft. On the other hand, the V-block and the retainer block are adapted to be engageable with a lower end of the support shaft which is the above-indicated other end of the support shaft.

According another feature of the invention, the first centering device further includes a stationary housing, a movable member which is supported by the statonary housing movably in the broaching direction but non-rotatably relative to the stationary housing, and a rotatable member supported by the stationary housing rotatably about an axis thereof but immovably in the broaching direction relative to the housing. The movable member carries the center, and the rotatable member includes an externally threaded portion which engages the movable member, so that the center carried by the movable member is moved in the broaching direction by rotation of the rotatable member relative to the movable member.

In accordance with a further feature of the invention, the second centering device further comprises a support structure, pushing means and an actuator member. The support structure has a cutout formed therein to accommodate the V-block and the retainer block such that one of the V-block and the retainer block is movable relative to the other. The pushing means is supported by the support structure movably between a first position in which the above-indicated one of the V-block and the retainer block is moved toward the other to clamp the above-indicated one end of the support shaft of the rotor therebetween, and a second position in which the above-indicated one of the V-block and the retainer block is movable away from the other so as to unclamp the above-indicated one end of the support shaft. The actuator member is supported by the support structure and is operable to move the pushing means to the first position.

In one advantageous form of the above feature of the invention, the pushing means is in the form of a pivotable lever pivotally supported by the support structure. The pivotable lever includes a first arm abutable on one of the V-block and the retainer block when the pivotable lever is moved to the first position, and a second arm which engages the actuator member so as to pivot the pivotable lever to the first position. In this case, the actuator member may be a generally elongate member which is longitudinally movable in a direction parallel to an axis of pivoting of the pivotable lever. This elongate member has a tapered surface which engages a corresponding tapered surface formed on the second arm of the pivotable lever, so that the pivotable lever is pivoted to the first position when the generally elongate member is moved in one of opposite directions in the direction parallel to the axis of pivot. The first arm of the pivotable lever may be adapted to abut on the retainer block.

According to a still further feature of the invention, the retainer block has a groove which has a cross sectional shape corresponding to a circular arc which corresponds to an outside diameter of the above-indicated other end of the support shaft. A surface which defines the groove of the retainer block cooperates with a surface of the V-block which defines a V-groove, to clamp the above-indicated other end of the support shaft of the rotor therebetween.

According to yet another feature of the invention, the backing plate has an external profile which is similar to a cutting edge contour of the broach. The backing plate is dimensioned so that the external profile is inwardly spaced by a predetermined distance from the cutting edge contour of the broach in a plane perpendicular to the broaching direction.

In accordance with a further feature of the invention, the positioning pin has a tapered end portion which engages the positioning hole in the rotor. The tapered end portion has a small end which has a diameter smaller than a diameter of the positioning hole, and a large end which has a diameter larger than the diameter of the positioning hole. The positioning pin may be movable in the broaching direction relative to the backing plate and the rotor assembly. In this case, adjusting means may be provided for adjusting the degree of projection of the positioning pin from the backing plate.

The broaching machine of the invention is suitable for broaching an external surface of a resin layer which covers an outer surface of a core member of the rotor. In this instance, the broach has a cutting edge whose contour is identical with a desired cross sectional profile of the resin layer, for example, a profile corresponding to a shape of a cocoon or a peanut shell.

BRIEF DESCRIPTION OF THE DRAWINGS

The foregoing and other objects, features and advantages of the present invention will become more apparent by reading the following detailed description of a preferred embodiment of the invention, when considered in connection with the accompanying drawings, in which.

DESCRIPTION OF THE PREFERRED EMBODIMENT

Figure 1:
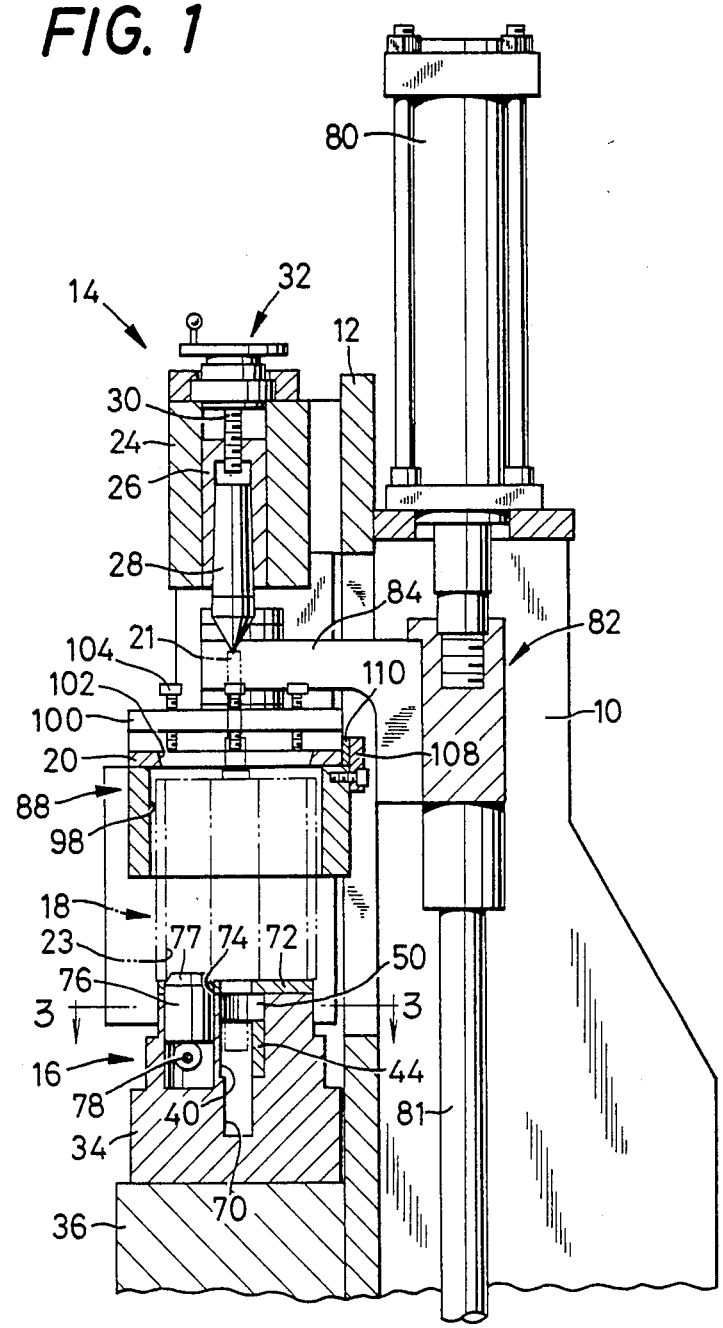
FIG. 1 is a fragmentary side elevational view in cross section of one embodiment of a broaching machine of the present invention.

Referring to the drawings, the preferred embodiment of a broaching machine of the invention will now be described in detail.

Figure 2:
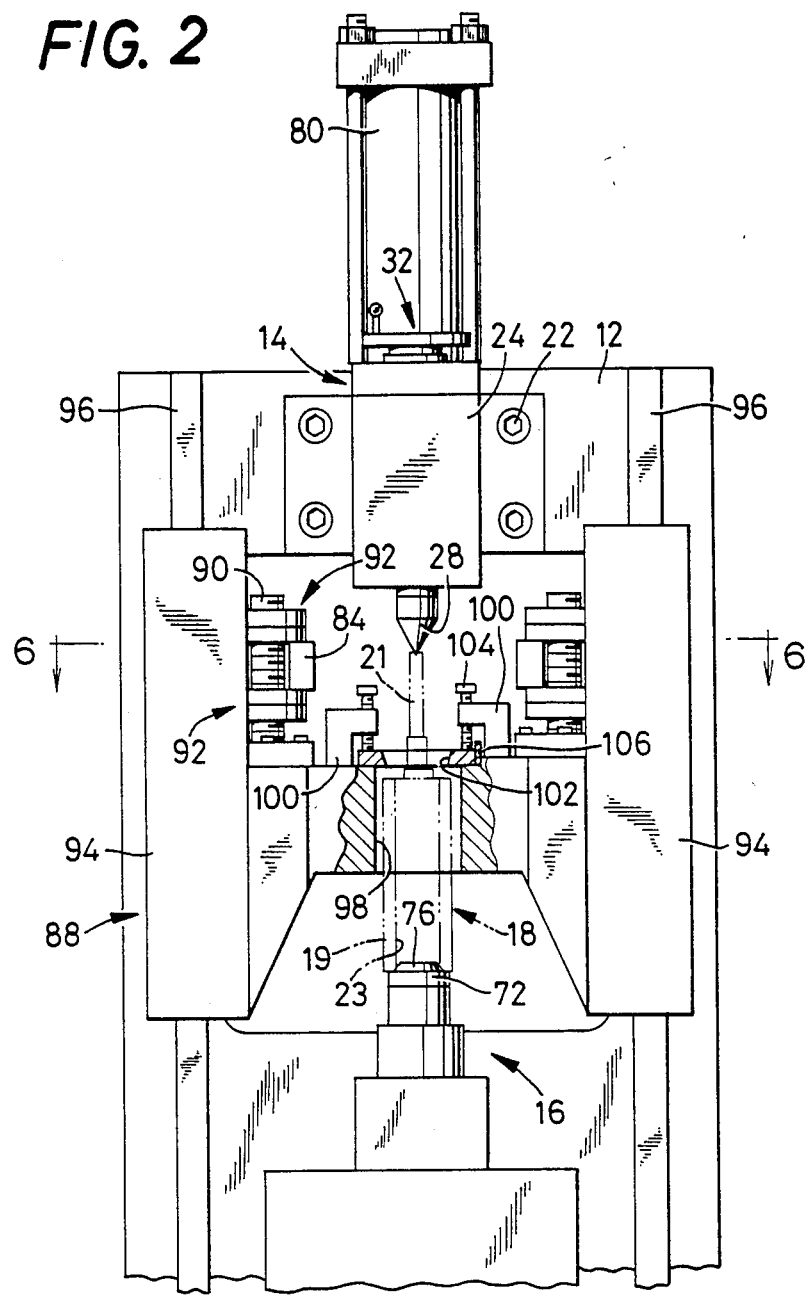
FIG. 2 is a fragmentary, partially cutaway front elevational view of the broaching machine of FIG. 1.
Figure 7:
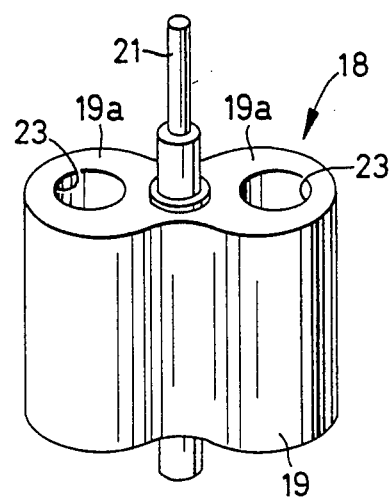
FIG. 7 is a perspective view of an example of a rotor assembly to be broached by the broaching machine of FIGS. 1-6.

In FIGS. 1 and 2, reference numeral 10 designates a frame of the broaching machine. To the front surface of the frame 10 is secured a mounting bracket 12 on which a first centering device 14 and a second centering device 16 are mounted. The first and second centering devices 14, 16 are spaced apart from each other in the vertical direction such that the first centering device 14 is located above the second centering device 16. These devices 14, 16 serve as centering means for holding and centering a workpiece in the form of a rotor assembly 18 which is positioned between the two centering devices 14, 16, as indicated in broken lines in FIGS. 1 and 2. As described below, the rotor assembly 18 is broached by a formed broach 20 which is adapted to be fed in the vertical direction between the first and second centering devices 14, 16. As shown in FIG. 7, the rotor assembly 18 consists of a lobe-type rotor 19, and a support shaft 21 which projects from opposite end faces of the rotor 19 in opposite directions parallel to an axis of rotation of the rotor 19. This rotor assembly 18 is used in a rotary fluid machine such as a fluid pump or supercharger of a Roots type. The lobe-type rotor 19 consists of a core member made of a light alloy, and a resin layer which covers an outer surface of the core member. The resin-coated rotor 19, which consists of a pair of lobes 19a, 19a, has an external cross-sectional profile similar in shape to that of a cocoon or peanut shell, as shown in FIG. 7. The support shaft 21 is made of a steel material, and is press-fitted through the rotor 19 so that the shaft 21 forms the axis of rotation of the rotor 19. A pair of axial bores 23, 23 are formed through the corresponding lobes 19a, 19a, for the purpose of reducing the weight of the rotor assembly 21 and saving the material cost of the rotor 19. In this embodiment, however, one of the axial bores 23 is used as a positioning hole which cooperates with a positioning pin 76 to position the rotor assembly 18, as described later in greater detail.

Referring back to FIGS. 1 and 2, the first centering device 14 includes: a stationary housing 24 fixed to the mounting bracket 12 by bolts 22; a movable member 26 which is supported by the stationary housing 24 so that the movable member 26 is slidably movable in the vertical direction, but not rotatable relative to the stationary housing 24; a center portion 28 fitted in the movable member 26 so that the center portion 28 is longitudinally movable together with the movable member 26; and a rotatable member 32 which is rotatably supported at its upper portion by the stationary housing 24, and which has an externally threaded portion 30 extending downwardly from an upper portion. The threaded portion 30 of the rotatable member 32 is threaded in the upper end wall of the movable member 26, so that the movable member 26 and the center portion 28 fixed therein are moved in the vertical direction by rotating the rotatable member 32.

Figure 3:
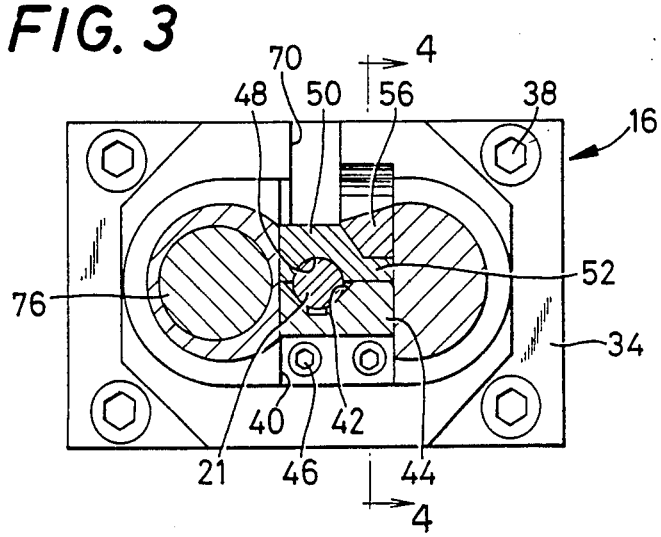
FIG. 3 is a cross sectional view taken along line 3—3 of FIG. 1.
Figure 4:
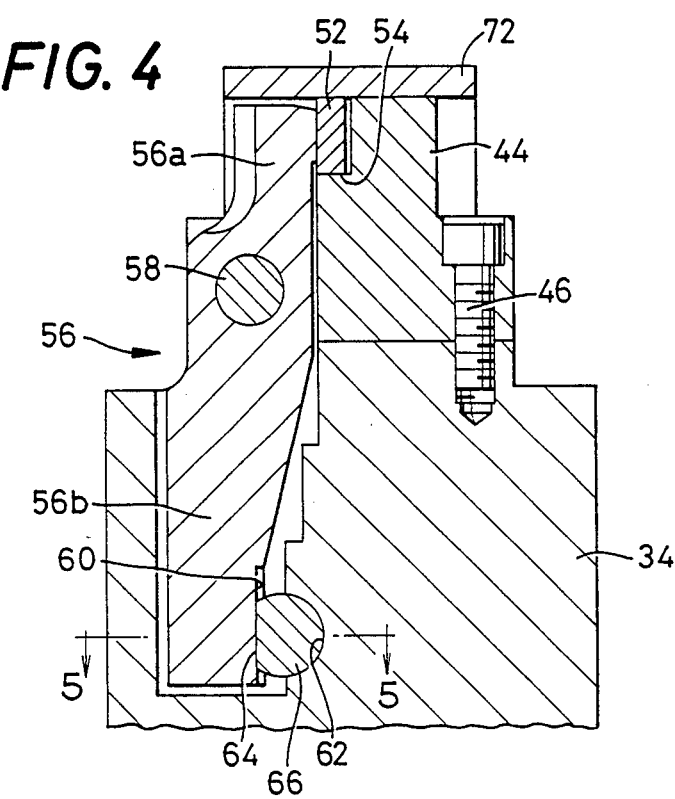
FIG. 4 is a fragmentary cross sectional view taken along line 4—4 of FIG. 3.

The second centering device 16 includes a support structure in the form of a work bed 34 which is mounted on a base 36 secured to the mounting bracket 12. The support structure 34 of the second centering device 16, or the work bed 34 of the broaching machine, is secured to the upper surface of the base 36 by means of bolts 38, as shown in FIG. 3. In an upper, longitudinally central portion of the work bed 34, there is formed a cutout 40 which extends in the direction of width of the work bed 34. In the cutout 40, there is fixed a V-block 44 by bolts 46, such that a V-groove 42 formed in one of opposite surfaces of the V-block 40 is located substantially in the center of the work bed 34. The cutout 40 further accommodates a retainer block 50 which has a semicircular groove 48 whose cross sectional shape corresponds to a circular arc of an outside diameter of the lower end portion of the support shaft 21 of the rotor assembly 18. The retainer block 50 has a thin-walled portion 52 at one of its longitudinal opposite ends, and is positioned opposite the V-block 44 such that the thin-walled portion 52 rests on a shoulder 54 of the V-block 44, as shown in FIG. 4. The shoulder 54 is formed at one of the longitudinal opposite ends of the V-block 44, and in one of the opposite surfaces of the V-block 44 which faces the retainer block 50. With the V-block 44 and the retainer block 50 thus positioned relative to each other, the surface of the retainer block 50 defining the semicircular groove 48 cooperates with the surface of the V-block 44 defining the V-groove 42, to clamp and center the lower end portion of the support shaft 21, when the retainer block 50 is moved toward the V-block 44, as described below in greater detail.

On one of the opposite sides of the thin-walled portion 52 of the retainer block 50 which is remote from the V-block 44, there is disposed pushing means in the form of a pivotable push lever 56 as indicated in FIGS. 3 and 4.

Figure 5:
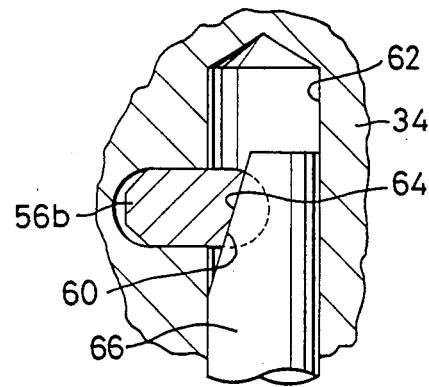
FIG. 5 is a fragmentary cross sectional view taken along line 5—5 of FIG. 4.

Referring further to FIG. 5 as well as FIGS. 3 and 4, the push lever 56 has a generally elongate shape, and is pivotally supported by a pin 58 which is fixed to the work bed 34 so as to extend in the horizontal direction, i.e., perpendicularly to the support shaft 21 to be clamped and centered by the second centering device 16. The push lever 56 consists of a first arm 56a and a second arm 56b which are located on opposite sides of the pin 58. The first arm 56a is abutable on the thin-walled portion 52 of the retainer block 50 so as to force the retainer block 50 toward the V-block 44, when the push lever 56 is pivoted to its first or operated position. The second arm 56b has a tapered surface 60 as most clearly shown in FIG. 5. This tapered surface 60 is engageable with a generally elongate actuator member in the form of a columnar member 66. More specifically described, the columnar member 66 is slidably received in a hole 62 which is formed in the work bed 34 parallel to the axis of the pivot pin 58 of the push lever 56. At one of opposite end portions of the columnar member 66, there is formed a tapered surface 64 which is engageable with the tapered surface 60 of the second arm 56b of the push lever 56. The other end portion (not shown) of the columnar member 66 has a tapped hole in which is threaded a screw portion of a suitable operating member (not shown) rotatably supported by the work bed 34. The columnar member 66 is longitudinally slidably moved in the hole 62 when the operating member is rotated.

In the second centering device 16 constructed as described above, movement of the columnar member 66 in the direction away from the operating member (in the upward direction in FIG. 5) will cause the tapered surface 64 to force the tapered surface 60 of the second arm 56b of the push lever 56, whereby the push lever 56 is pivoted (clockwise in FIG. 4) to its first or operated position, whereby the first arm 56a is forced against the retainer block 50, and the lower end of the support shaft 21 of the rotor assembly 18 disposed between the two blocks 44, 50 is forced by the retainer block 50 against the V-block 44. In this manner, the lower end of the support shaft 21 is clamped and centered by and between the two blocks 44, 50.

The cutout 40 terminates at its lower end into a lower cutout 70 which is formed in a relatively lower portion of the work bed 34, as indicated in FIGS. 1 and 3. The cutout 70 extends from one of opposite long side surfaces of the work bed 34 on the side of the retainer block 50, to the V-groove 42 formed in the V-block 44. This cutout 70 accommodates various lengths of the lower end portion of the support shaft 21, when the rotor assembly 18 is set on the second centering device 16.

A backing plate 72 is fixed on the top surface of the work bed 34. This backing plate 72 is provided to back the rotor assembly 18 such that the lower end face of the rotor 19 is held in contact with the upper surface of the backing plate 72 at which a broaching cut by the formed broach 20 in the vertical direction is terminated. The backing plate 72 has an external profile which is similar to a contour of a cutting edge 102, namely, similar to a desired finish profile of the resin layer of the rotor 19. However, the profile of the backing plate 72 is inwardly spaced by a suitable predetermined distance from the contour of the cutting edge 102 in a plane perpendicular to the axis of rotation of the rotor assembly 18, that is, perpendicular to the broaching direction of the machine. The backing plate 72 has a central hole, or a radial slot formed from its periphery to its center, so that the lower end portion of the support shaft 21 is inserted through the central hole or a radial slot. Further, the backing plate 72 has a hole 74 formed at a position corresponding to one of the two axial bores 23 which serves as a positioning hole. On the other hand, the previously indicated positioning pin 76 is received in the work bed 34 slidably in the vertical or broaching direction. The lower end face of the positioning pin 76 is held in contact with the periphery of an eccentric periphery cam 78 which is supported by the work bed 34 about an axis perpendicular to the broaching direction of the machine. The pin 76 has a tapered upper end portion 77 which extends through the hole 74 in the backing plate 72, and engages the positioning hole 23 open in the lower end face of the rotor 19. Described more specifically, the tapered end portion 77 has a small end which has a diameter smaller than the diameter of the positioning hole 23, and a large end which has a diameter larger than the diameter of the positioning hole 23. In this arrangement, the positioning pin 76 is moved upward by rotating the cam 78, until the tapered surface of the tapered upper end portion 77 comes into contact with the edge of the positioning hole 23. In other words, the cam 78 serves as means for adjusting the degree of projection of the positioning pin 76 from the upper surface of the backing plate 72. Thus, the rotor assembly 18 is positioned by the positioning pin 76 in the circumferential direction. It is noted that the tapered upper end portion 77 of the positioning pin 76 is advantageous because it contributes to compensating for a possible variation in the diameter of the positioning hole 23 from the nominal value.

Figure 6:
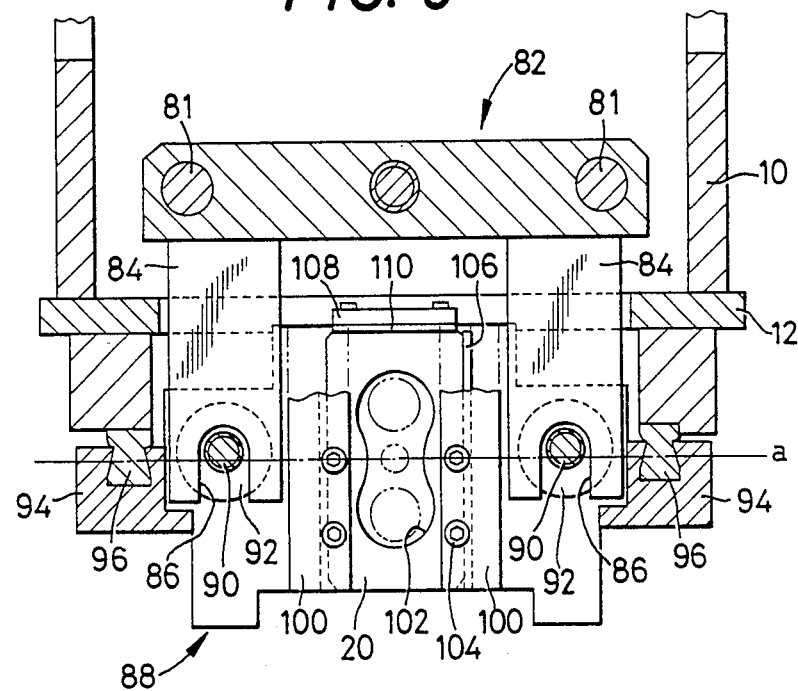
FIG. 6 is a fragmentary, partially cutaway view in cross section, taken along line 6—6 of FIG. 2.

The formed broach 20 is fed in the broaching direction by a cylinder 80 fixed at the upper end of the frame 10, as indicated in FIG. 1. Stated more specifically referring to FIG. 6, a first slide 82 is reciprocated in the vertical direction by the cylinder 80 while being guided by a pair of parallel spaced-apart guide rods 81. The first slide 82 is provided with a pair of parallel spaced-apart arms 84 each of which has a U-shaped slot 86 formed at its free end. A second slide 88 is fixed to the first slide 82 by means of a pair of externally threaded shafts 90 which are attached to the second slide 88. The threaded shafts 90 extend through the U-shaped slots 86 of the arms 84. Each threaded shaft 90 is clamped to the corresponding arm 84 by a pair of ring nuts 92 which engage the threaded shaft 90 on opposite sides of the corresponding arm 84, so as to tighten the arm 84 on the upper and lower surfaces. Thus, the first and second slides 82, 88 are moved as a unit by the cylinder 90. The second slide 88 is provided with a pair of elongated guides 94 which are located outwardly of the externally threaded shafts 90. These guides 94 engage respective guide rails 96 which are secured to the mounting bracket 12, such that the points of engagement of the rails 96 with the guides 94 lie substantially on a straight line "a" (FIG. 6) which passes the longitudinal center of the rotor assembly 18, parallel to the slide 82, as shown in FIG. 6. Thus, the second slide 88 is guided in the vertical direction while its positions in the horizontal plane are maintained.

As shown in FIGS. 1 and 2, the second slide 88 has an elliptical through-hole 98 formed in its central portion. This through-hole 98 has an elliptical cross sectional shape whose major axis is normal to the plane of the mounting bracket 12. The second slide 88 has a pair of extensions 100 formed on its upper surface such that the extensions 100 are disposed in opposed relation with each other, on opposite sides of the elliptical open end of the through-hole 98. Each extension 100 has an inverted-L shape in cross section, as indicated in FIG. 2. The formed broach 20 is placed on the upper surface of the second slide 88, between the two extensions 100, such that the contour of the cutting edge 102 (substantially identical with the desired finish profile of the rotor 19) is aligned with the ellipse of the through-hole 98. The broach 20 is pressed against the upper surface of the second slide 88 by a plurality of clamp screws 104 which are threaded through the extensions 100 so as to abut at their lower end on the peripheral parts of the broach 20 parallel to the extensions 100. The broach 20 is positioned relative to the second slide 88 by a first shim 106 and a second shim 110. The first shim 106 is inserted between one of opposite side faces of the broach 20, and a shoulder face formed on the upper surface of the second slide 88, as shown in FIG. 2. The second shim 110 is inserted between one of opposite end faces of the broach 20, and a plate 108 attached to a side surface of the second slide 88 on the side of the mounting bracket 12, as indicated in FIG. 6.

In the broaching machine which has been described, the workpiece in the form of the rotor assembly 18 is mounted on the work bed 34, such that the lower end face of the assembly 18 is held in contact with the upper surface of the backing plate 72, and the lower end portion of the support shaft 21 is clamped and centered by the V-block 44 and the retainer block 50 of the second centering device 16. Further, the tapered upper end portion 77 of the positioning pin 76 which projects from the backing plate 72 by a suitable distance, is held in engagement with the positioning hole 23 which is open in the lower end face of the rotor 19. Thus, the predetermined circumferential position of the rotor assembly 18 is established.

The lower end portion of the support shaft 21 is easily clamped between and centered by the two blocks 44, 50, by a simple pivoting movement of the push lever 56 from its second or non-operated position to its first or operated position, as previously described. In the meantime, the upper end portion of the support shaft 21 is supported and centered by the center 28 of the first centering device 14. More specifically, the rotatable member 32 is rotated to lower the center portion 28, until the center portion 28 comes into engagement with a center hole formed in the upper end face of the support shaft 21. Thus, the rotor assembly 18 is readily and quickly clamped at its upper and lower ends, positioned in the circumferential direction, and centered with its axis of rotation aligned with a line of feed of the broach 20. Consequently, the non-productive time spent in setting up the workpiece (rotor assembly 18) and removing the same is significantly reduced. Namely, the first and second centering devices 14, 16 assures improved operating efficiency of the instant broaching machine.

Further, the instant broaching machine is capable of broaching the external surface of a heat-and wear-resistant resin layer (e.g., formed of fluorocarbon resins) of the rotor 19, without chipping or breakage of the resin material near or at the lower end of the rotor 19, since the backing plate 72 is used to back the rotor 19 at its lower end face. As previously described, the external profile of the backing plate 72 is slightly spaced inwardly from the contour of the cutting edge 102 of the formed broach 20.

Further, the instant broaching machine permits a precise external broaching cut on the rotor 19 by the broach 20, since the second slide 88 is stably and accurately guided by its elongate guides 94 and the guide rails 96 fixed to the mounting bracket 12. The guides 94 and the rails 96 engage each other at spaced-apart positions which lie on the line "a" which passes the longitudinal center of the rotor assembly 18 in its transverse cross section. Further, the engaging surfaces of the guides 94 and the rails 96 are so configured as to protect the second slide 88 from displacements in the horizontal plane perpendicular to the broaching direction. These features are combined to prevent the broach 20 under cutting operation from deviating from the nominal broaching path and thereby forcing the resin layer of the rotor 19 during a broaching cut, which would result in lowering the dimensional accuracy of the finished or broached surface of the resin layer.

Since the formed broach 20 used in the present embodiment is designed to broach the entire periphery of the rotor 19, the broaching efficiency and the smoothness of the broached surface (finished surface of the resin layer) are improved, as compared with those where broach operation is performed with a broach which is designed to broach a part or half of the entire periphery of the rotor.

While the present invention has been described in its preferred embodiment with a certain degree of particularity, it is to be understood that the invention is by no means confined to the precise details of the illustrated embodiment, but may be otherwise embodied.

For example, while the positioning pin 76 in the illustrated embodiment is adapted to be movable and protrude above the upper surface of the backing plate 72 through the hole 74, it is possible that a positioning pin may be formed with or fixed to the backing plate 72 or work bed 34.

In the illustrated embodiment, the pivotable push lever 56 and the actuator member 66 are used for forcing the retainer block 50 toward the V-block 44, the push lever 56 and the actuator member 66 may be replaced by other suitable means, such as screws adapted to directly force the retainer block 50 against or toward the V-block.

While the second slide 88 on which the broach 20 is mounted is driven by the cylinder 80 via the first slide 82, the slide 88 may be directly connected to and fed by the cylinder 80.

Although the illustrated embodiment uses the formed broach 20 for broaching the entire periphery of the rotor 19, the advantages of the present invention such as easy and fast clamping, centering, circumferential positioning and removal of the rotor assembly 18 may be offered even where the broaching machine uses other types of broach cutters, for example, a broach designed to broach a part of the entire periphery of the rotor 19.

It will be obvious that the present invention may be embodied with various other changes, modifications and improvements which may occur to those skilled in the art, without departing from the spirit and scope of the invention defined in the appended claims.

What is claimed is:

1. A broaching machine for broaching an outer surface of a rotor assembly by feeding a broach in a broaching direction parallel to an axis of rotation of the rotor assembly, said rotor assembly including a lobe-type rotor having a pair of lobes so as to form an external cross-sectional profile similar in shape to that of a peanut shell and forming said outer surface, and a support shaft which projects from opposite end faces of said lobe-type rotor in opposite directions parallel to said axis of rotation, said broaching machine comprising:

a backing plate for backing said rotor assembly such that said backing plate is held in contact with one of said opposite end faces of said lobe-type rotor at which said broach terminates a broaching cut in said broaching direction;

a positioning pin extending from said backing plate toward said one end face of said lobe-type rotor and engaging a positioning hole formed in an end face of one of said pair of lobes of said lobe-type rotor, thereby positioning said rotor assembly in a circumferential direction thereof; and means for centering said rotor assembly to align said axis of rotation thereof with a line of feed of said broach in said broaching direction, said means for centering said rotor assembly comprising a first centering device which includes a center portion engageable with one of opposite ends of said support shaft so as to hold and center said support shaft at said one end thereof, and a second centering device including a V-block and a retainer block which are engageable with the other end of said support shaft so as to hold and center said support shaft at said other end thereof.

2. A broaching machine according to claim 1, wherein said first and second centering devices are positioned relative to said backing plate such that said other end of said support shaft of said rotor assembly to be held by said second centering device corresponds to said one end face of said lobe-type rotor, while said one end of said support shaft to be held by said first centering device corresponds to the other end face of said lobe-type rotor.

3. A broaching machine according to claim 2, further comprising means for feeding said broach in the vertical direction, said center portion being engageable with an upper end of said support shaft wherein said upper end comprises said one end of said support shaft, said V-block and said retainer block are engageable with a lower end of said support shaft and wherein said lower end comprises said other end of said support shaft.

4. A broaching machine according to claim 1, wherein said first centering device further includes:
a stationary housing;
a movable member supported by said stationary housing movably in said broaching direction and non-rotatably relative to said stationary housing, said movable member carrying said center portion; and
a rotatable member supported by said stationary housing rotatably about an axis thereof and immovably in said broaching direction relative to said housing, said rotatable member including an externally threaded portion which engages said movable member, so that said center portion carried by said movable member is moved in said broaching direction by rotation of said rotatable member relative to said movable member.

5. A broaching machine according to claim 1, wherein said second centering device further comprises:
a support structure having a cutout formed therein to accommodate said V-block and said retainer block such that said V-block and said retainer block are movable relative to one another;
pushing means supported by said support structure movably between a first position in which said one of the V-block and the retainer block is forced toward the other so as to clamp said one end of said support shaft of said rotor therebetween, and a second position in which said one of the V-block and the retainer block is movable away from the other so as to unclamp said one end of said support shaft; and an actuator member supported by said support structure and operable to move said pushing means to said first position.

6. A broaching machine according to claim 5, wherein said pushing means comprises a pivotable lever pivotally supported by said support structure, said pivotable lever including a first arm abutable on one of said V-block and said retainer block when said pivotable lever is moved to said first position, and a second arm which engages said actuator member so as to pivot said pivotable lever to said first position.

7. A broaching machine according to claim 6, wherein said actuator member comprises a generally elongate member which is longitudinally movable in a direction parallel to an axis of pivoting of said pivotable lever, said generally elongate member having a tapered surface which engages a corresponding tapered surface formed on said second arm of said pivotable lever, so that said pivotable lever is pivoted to said first position when said generally elongate member is moved in one of opposite directions in the direction parallel to said axis of pivot.

8. A broaching machine according to claim 6, wherein said first arm of said pivotable lever is abutable on said retainer block.

9. A broaching machine according to claim 1, wherein said retainer block has a groove which has a cross sectional shape corresponding to a circular arc which corresponds to an outside diameter of said other end of said support shaft, a surface which defines said groove of said retainer block cooperating with a surface of said V-block which defines a V-groove, to clamp said other end of said support shaft of said rotor therebetween.

10. A broaching machine according to claim 1, wherein said backing plate has an external profile which is similar to a cutting edge contour of said broach, and which is inwardly spaced by a predetermined distance from said cutting edge contour of said broach in a plane perpendicular to said broaching direction.

11. A broaching machine according to claim 1, wherein said positioning pin has a tapered end portion which engages said positioning hole in said lobe-type rotor, said tapered end portion has a small end which has a diameter smaller than a diameter of said positioning hole, and a large end which has a diameter larger than said diameter of said positioning hole.

12. A broaching machine according to claim 1, wherein said positioning pin is movable in said broaching direction relative to said backing plate and said lobe type rotor assembly.

13. A broaching machine according to claim 12, further comprising means for adjusting a degree of projection of said positioning pin from said backing plate.

14. A broaching machine according to claim 13, wherein said adjusting means comprises an eccentric periphery cam supported rotatably about an axis perpendicular to said broaching direction, said positioning pin engaging said positioning hole at one of opposite end thereof, and engaging said eccentric periphery cam at the other end thereof.

15. A broaching machine according to claim 1, wherein said rotor comprises a core member and a resin layer covering an outer surface of said core member, said broach having a cutting edge with a contour identical with a desired finished outer surface of said resin layer.

* * * * *

UNITED STATES PATENT AND TRADEMARK OFFICE
CERTIFICATE OF CORRECTION

PATENT NO. : 4,730,963
DATED      : Mar. 15, 1988
INVENTOR(S): Yosio Kuroiwa, et al.

It is certified that error appears in the above-identified patent and that said Letters Patent is hereby corrected as shown below:

The name of the second inventor should be printed as follows:

-- Hisao Shirai--

Signed and Sealed this

Second Day of August, 1988

Attest:

DONALD J. QUIGG

*Attesting Officer*      *Commissioner of Patents and Trademarks*